United States Patent [19]

Katsoulis et al.

[11] Patent Number: 6,046,283
[45] Date of Patent: *Apr. 4, 2000

[54] RUBBER-MODIFIED RIGID SILICONE RESINS AND COMPOSITES PRODUCED THEREFROM

[75] Inventors: Dimitris Elias Katsoulis; John Robert Keryk, both of Midland, Mich.; Frederick Jerome McGarry, Weston, Mass.; Bizhong Zhu, Midland, Mich.

[73] Assignees: Massachusetts Institute of Technology, Cambridge; Dow Corning Corporation, Midland, both of Mich.

[*] Notice: This patent is subject to a terminal disclaimer.

[21] Appl. No.: 09/067,945

[22] Filed: Apr. 28, 1998

Related U.S. Application Data

[63] Continuation-in-part of application No. 08/775,557, Dec. 31, 1996, Pat. No. 5,830,950, and a continuation-in-part of application No. 08/775,661, Dec. 31, 1996, Pat. No. 5,747,608.

[51] Int. Cl.⁷ .................................................. C08F 283/00
[52] U.S. Cl. ......................... 525/477; 525/478; 528/15; 528/17; 528/18; 528/19; 528/21; 528/34; 528/24
[58] Field of Search .................. 525/477, 478; 528/15, 17, 18, 19, 21, 34, 24

[56] References Cited

U.S. PATENT DOCUMENTS

| | | | |
|---|---|---|---|
| 5,034,061 | 7/1991 | Maguire et al. | 106/287.14 |
| 5,268,433 | 12/1993 | Ikeno et al. | 525/478 |
| 5,747,608 | 5/1998 | Katsoulis et al. | 525/477 |
| 5,830,950 | 11/1998 | Katsoulis et al. | 525/477 |

FOREIGN PATENT DOCUMENTS

| | | | |
|---|---|---|---|
| 691206 | 7/1964 | Canada | 400/73 |
| 0 530 502 A1 | 3/1993 | European Pat. Off. | G03G 15/20 |

OTHER PUBLICATIONS

Effects of Rubber Additions On The Fracture Toughness of A Polyester Resin; Tetlow et al.; 34th Annual Technical Conference, 1979; Section 23–F, p. 1–4.

Crack Toughened Polyester Resin Formulations; McGarry et al.; American Chemical Society Division of Organic Coating and Plastics Chemistry; vol. 28, No. 1; pp. 526–536.

*Primary Examiner*—Margaret G. Moore
*Attorney, Agent, or Firm*—Timothy J. Troy

[57] ABSTRACT

Novel rubber-modified rigid silicone resins are disclosed. The novel resins are the copolymerized reaction product of (A) an organosilicon composition selected from the group consisting (I) an organosilicone resin, (II) hydrolyzable precursors of (I), and an hydrolyzate of (II), (B1) a first silicone rubber having a nonfunctional linear chain length between functional groups from 6 to 100 and (B2) a second silicone ruberr having terminal functional groups and a degree of polymerization from about 200 to 1,000. The novel rubber-modified rigid silicone resins of the invention show remarkably high fracture toughness, $K_{Ic}$, and critical strain energy release rate $G_{Ic}$.

15 Claims, 6 Drawing Sheets

RUBBER-MODIFIED RIGID SILICONE RESINS AND COMPOSITES PRODUCED THEREFROM

CROSS-REFERENCE TO RELATED APPLICATIONS

The present application for patent is a continuation-in-part of U.S. patent application Ser. Nos. 08/775,557 and 08/775,661, each of which was filed on Dec. 31, 1996, and now U.S. Pat. Nos. 5,830,950 and 5,747,608, respectively.

BACKGROUND OF THE INVENTION

1. Field of the Invention

The present invention relates generally to the field of silicone resins and more particularly to such resins having silicone rubbers incorporated into their structure. The rubber-modified silicone resins show a marked improvement in fracture toughness.

2. Description of the Prior Art

For some time, it has been known that making rubber additions to organic polymer resins can increase the toughness thereof. Such systems are disclosed in, for instance, an article entitled *Effects of Rubber Additions On The Fracture Toughness Of A Polyester Resin* (Tetlow, P. D. et al. Proceedings of the Annual Technical Conference, 1979, Reinforced Plastics/Composites Institute The Society of the Plastics Industry, Inc. Vol. 34, 23F) and a paper entitled *Crack Toughened Polyester Resin Formulations* (McGarry, F. J. et al., American Chemical Society Division of Organic Coating and Plastics Chemistry Vol. 28, No. 1, pp 526–36) presented in San Francisco in April 1968.

Increasing the toughness of various silicone compositions has also been previously carried out. Maguire et al., U.S. Pat. No. 5,034,061 discloses a silicone resin/fluid polymer adapted to form a transparent, shatter-resistant coating. The composition includes a silicone resin copolymer consisting essentially of $R_3SiO_{1/2}$ and $SiO_{4/2}$ units with unsaturated olefinic functional R groups, a polydiorganosiloxane fluid with vinyl functionality, an organopolysiloxane crosslinker having hydrogen functionality and a catalyst. The composition is disclosed as being particularly adapted for use in coating incandescent glass lamps.

Canadian Patent No 691,206 (1964,) Fenner, assigned to Dow Corning Corporation, discloses the use of silica-filled silicone resin/fluid combinations for damping vibrations. The ability of the disclosed silicone resin/fluid compositions to dampen vibrations is illustrated through the measurement of the ratio of G', the elastic shear modulus, to G", the loss shear modulus. The magnitude of this ratio is indicated as being inversely proportional to the ability of the material to absorb vibration. The ratio of G'/G" of the subject materials is compared to that of compositions prepared without a resin constituent.

The above-described toughened silicone compositions are generally of the types having a fairly low modulus of elasticity. Heretofore, successfully increasing the fracture toughness of rigid silicone resins has not been accomplished. As used herein to describe silicone resins, the term "rigid" means that the resin material, in its unfilled condition, exhibits a certain "stiffness" characterized by having a Young's modulus of at least $6.9 \times 10^8$ Pa. As used herein, the term "unfilled" means that no reinforcing fillers, such as carbon or glass fibers or silica powders have been added to the resin.

Rigid silicone resins have long been employed in applications that take advantage of their heat- and fire-resistant properties. These properties make the silicone resins attractive for use in fiber-reinforced composites for electrical laminates, structural use in automotive components, aircraft and naval vessels. The unmodified rigid silicone resins of the prior art are, however, quite brittle which severely limits their use.

Thus, there exists a need for rigid silicone resins having substantially increased fracture toughness which would permit the exploitation of the unique fire-, electrical- and heat-resistant properties in applications where brittle failure must be avoided.

SUMMARY OF THE INVENTION

In copending U.S. patent application Ser. Nos. 08/775,557 now U.S. Pat. No. 5,830,950 and 08/775,661, now U.S. Pat. No. 5,747,608 each of which was filed on Dec. 31, 1996, it was disclosed that in silicone rubber-modified silsesquioxane resins, as the degree of polymerization ("DP") of the silicone rubber component became relatively large, e.g. between about 55 and 200, the rubber component had a tendency to segregate from the cured resin matrix. Thus, the cured resin matrix appeared as a two phase system. The entire disclosure of both aforementioned copending patent applications is incorporated herein, by reference.

In the above-noted copending patent applications it was also disclosed that the silicone rubber component could be a blend of several silicone rubbers of varying degrees of polymerization.

Subsequent investigation has lead the present inventors to the surprising discovery that using a system of silicone rubbers having a bimodal distribution of nonfunctional linear chain lengths can unexpectedly and synergistically raise the fracture toughness $(K_{Ic})$ and critical strain energy release rate $(G_{Ic})$ of cured silsesquioxane resin structures which incorporate the same.

In accordance with the present invention, there is provided a rubber-modified rigid silicone resin having improved fracture toughness. The rubber-modified rigid silicone resin of the invention comprises a copolymer prepared from:

(A) an organosilicon composition selected from the group consisting of:

(I) an organosilicone resin consisting essentially of silsesquioxane units and of the empirical formula

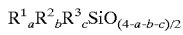
$R^1_a R^2_b R^3_c SiO_{(4-a-b-c)/2}$ wherein: a is a positive numerical value, b and c are zero or positive numerical values with the proviso that $0.8 \leq (a+b+c)-1.6$, $R^1$, $R^2$ and $R^3$ are monovalent radicals independently selected from the group consisting of hydrogen, hydroxyl, alkyl, alkenyl, alkoxy, oximo, alkyloximo, aryloximo, aryl, alkylepoxide, arylepoxide, alkylcarboxyl, arylcarboxyl, alkylether, arylether, alkylamide, arylamide, alkyl amino and arylamino radicals; and (II) hydrolyzable precursors of (I); and (III) an hydrolyzate formed from (II);

(B1) a first silicone rubber of the empirical formula:

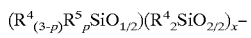
$(R^4_{(3-p)} R^5_p SiO_{1/2})(R^4_2 SiO_{2/2})_x$–

$\{(R^4_{(2-q)} R^5_q SiO_{2/2})(R^4_2 SiO_{2/2})_x\}_y (R^4_{(3-p)} R^5_p SiO_{1/2})$ wherein each $R^4$ is a monovalent radical independently selected from the group consisting of alkyl and aryl radicals, each $R^5$ is a monovalent radical independently selected from the group consisting of hydrogen hydroxyl, alkenyl, alkoxy, oximo, alkyloximo, aryloximo, alkylepoxide, arylepoxide, alkylcarboxyl, arylcarboxyl, alkylamide, arylamide, alkyl amino and arylamino radicals, p is 1, 2 or 3, q is 1 or 2, x ranges from 6 to 100, and y ranges from zero to 10; and (B2) a second silicone rubber of the empirical formula $$(R^4{}_{(3-p)}R^5{}_p SiO_{1/2})(R^4{}_2SiO_{2/2})_w(R^4{}_{(3-p)}R^5{}_p SiO_{1/2})$$

wherein $R^4$, $R^5$ and p are as defined above and w ranges from about 200 to about 1,000;

said organosilicon composition (A) and said first and second silicone rubbers (B1) and (B2) being present in relative quantities such that said rubber-modified silicone resin has a Young's modulus of at least $6.9 \times 10^8$ Pa.

The novel rubber-modified rigid silicone resins of the invention are produced by copolymerization. The copolymerization may be carried out via condensation reaction, addition reaction or free radical polymerization.

In the case where copolymerization is carried out via a condensation reaction, final cure of the resin may be accomplished after such copolymerization, by a heating step. It is believed that this heating step causes further condensation between the copolymerized molecules.

It is therefore an object of the present invention to provide a rubber-modified silicone resin having a Young's modulus of at least $6.9 \times 10^8$ Pa in the unfilled condition.

It is another object of the present invention to provide a rubber-modified rigid silicone resin that, in the unfilled condition, has increased fracture toughness, as measured by $K_{Ic}$, increased critical strain energy release rate, as measured by $G_{Ic}$, and integrated stress-strain toughness, compared to the silicone resin in its unmodified and unfilled condition.

BRIEF DESCRIPTION OF THE DRAWINGS

In FIG. 1 and each of the figures below, the vertical bars represent the spread of values obtained for several specimens.

DETAILED DESCRIPTION OF THE INVENTION

Figure 1:
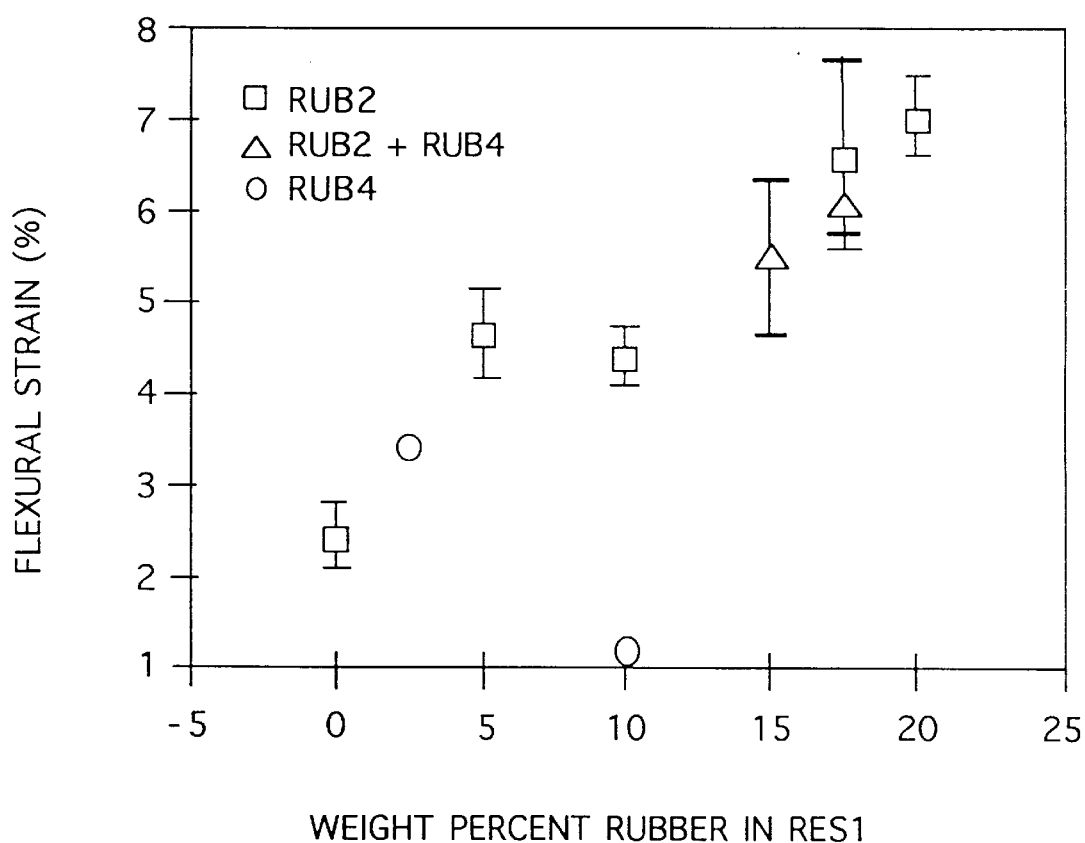
FIG. 1 is a graph of the Flexural Strain (%) at fracture (derived from three point bending in accordance with ASTM D 790) as a function of weight percent silicone rubber in RES1, a methylphenylsilsesquioxane resin, modified with two different silicone rubbers, RUB2 and RUB4, both independently and in combination. RUB2 and RUB4 have degrees of polymerization of 14 and 376, respectively. The weight percents of the combination of RUB2 and RUB4 are based upon 10 weight percent RUB2, the balance being RUB4.

The rubber-modified rigid silicone resin of the present invention comprises a copolymer formed from: (A) an organosilicon composition selected from the group consisting of (I) an organosilicone resin, (II) hydrolyzable precursors of (I); and (III) an hydrolyzate formed from (II); (B1) a first silicone rubber having a nonfunctional linear chain length from 6 to 100; and (B2) a second silicone rubber having a nonfunctional linear chain length from 200 to 1,000.

The organosilicone resin (I) has the empirical formula $$R^1{}_aR^2{}_bR^3{}_cSiO_{(4-a-b-c)/2}$$

wherein: a is a positive numerical value, b and c are zero or positive numerical values with the proviso that $0.8 \leq (a+b+c) \leq 1.6$, and each $R^1$, $R^2$ and $R^3$ are monovalent radicals independently selected from the group consisting of hydrogen, hydroxyl, alkyl, alkenyl, alkoxy, oximo, aryl, alkylepoxide, arylepoxide, alkylcarboxyl, arylcarboxyl, alkylether, arylether, alkylamide, arylamide, alkyl amino and arylamino radicals.

The organosilicone resin (I) of the organosilicon composition (A) is of the silsesquioxane-type and is made in a known manner by the hydrolysis and condensation of hydrolyzable precursors (II) of (I), which include the aforementioned $R^1$, $R^2$ and $R^3$ groups as a part of their structure. Such hydrolyzable precursors include trifunctional silanes, such as organotrialkoxysilanes and organotrihalosilanes, which produce the desired three dimensional resin structure, and monofunctional silanes, such as triorganomonoalkoxysilanes, triorganomonohalosilanes, disiloxanes and disilazanes, which act as endcappers. Those skilled in the art will also appreciate that difunctional silanes, such as diorganodihalosilanes and diorganodialkoxysilanes, and small amounts tetrafunctional silanes, such as tetrahalosilanes and tetraalkoxysilanes, may be included in the resin precursors.

In the preferred embodiment of the invention, the vast majority of the $R^1$, $R^2$ and $R^3$ groups are nonfunctional. That is to say, those groups do not participate in the copolymerization reaction to produce the rubber-modified rigid silicone resin of the invention and are preferably alkyl groups, aryl groups or a combination thereof and most preferably methyl groups, phenyl groups or a combination thereof.

The second component of the present invention is (B1) a first silicone rubber of the empirical formula:

$$(R^4{}_{(3-p)}R^5{}_p SiO_{1/2})(R^4{}_2SiO_{2/2})_x-$$
$$\{(R^4{}_{(2-p)}R^5{}_q SiO_{2/2})(R^4{}_2SiO_{2/2})_x\}_y(R^4{}_{(3-p)}R^5{}_p SiO_{1/2})$$

wherein each $R^4$ is a monovalent radical independently selected from the group consisting of alkyl and aryl radicals, each $R^5$ is a monovalent radical independently selected from the group consisting of hydrogen, hydroxyl, alkenyl, alkoxy, oximo, alkyl oximo, aryloximo, alkylepoxide, arylepoxide, alkylcarboxyl, arylcarboxyl, alkylamide, arylamide, alkyl amino and arylamino radicals, p is 1, 2 or 3, q is 1 or 2, x ranges from 6 to 100, and y ranges from 0 to 10.

It is important to note that the $R^4$ groups denote only alkyl and aryl groups. Hence, the $R^4$ groups do not participate in the copolymerization reaction. Each $R^5$, however, is a functional group which does participate in the copolymerization reaction to form the copolymer of the present invention.

In the above formula, x represents the average nonfunctional linear chain length of the silicone rubber, i.e. the average chain length between $R^5$ groups.

The third component of the invention is (B2) a second silicone rubber of the empirical formula

wherein $R^4$, $R^5$ and are as defined above and w ranges from about 200 to about 1,000. Thus, in the formula for (B2), w represents the average nonfunctional linear chain length of the silicone rubber, i.e. the average chain length between $R^5$ groups.

Most silicone rubbers used in connection with the present invention have $R^5$ groups only at the terminal groups of the chain. In such instances, the term "degree of polymerization" ("DP") as used herein is the same as the values of x and w. That is to say, the term DP does not include the terminal functional siloxy groups.

In the preferred embodiment of the invention, the $R^4$ groups are methyl groups, phenyl groups or a combination thereof. The present inventors have found that, when a high percentage of the $R^1$, $R^2$, $R^3$ groups of the organosilicon composition (A) and $R^4$ groups of the silicone rubbers (B1) and (B2) are either predominantly methyl or predominantly phenyl, the organosilicon composition (A) and the silicone rubber (B) are generally compatible, permitting the rubbers to be dispersed throughout the resin structure in a relatively homogeneous manner.

In accordance with the present invention, the organosilicon composition (A) and the silicone rubbers (B1) and (B2) are present in relative quantities such that the cured rubber-modified rigid silicone resin has a Young's modulus of at least $6.9 \times 10^8$ Pa. The present inventors have discovered that the Young's modulus of the rubber-modified silicone resins of the invention decreases with increasing rubber content. Thus, the relative quantities of the organosilicon composition (A) and rubbers (B1) and (B2) are selected such that the rigidity of the cured resin is not compromised to the extent that it cannot be satisfactorily used for structural applications. It will also be appreciated that the type of silicone rubber and the use of cross-linkers can also affect the Young's modulus of the modified resins of the invention. In most instances, however, additions of the first silicone rubber (B1) in excess of about 30 weight percent of the modified resin generally result in a composition having a Young's modulus less than that stipulated above.

Additions of the second silicone rubber (B2), when made in combination with the first silicone rubber, does not have as drastic an effect on the Young's modulus as when the additions are made independently. Hence, compositions in accordance with the invention may contain up to 30 weight percent of silicone rubber (B1) and up to 20 weight percent silicone rubber (B2), with the proviso that the aggregate quantity of (B1) and (B2) does not exceed about 35 weight percent of the composition of the invention. If these limits are maintained, the Young's modulus of the cured composition will generally be in excess of $6.9 \times 10^8$ Pa.

The second silicone rubber component (B2) has a maximum DP of 1,000. It has been found that as the DP of the second rubber component increases, the rubber component becomes less and less compatible with the remaining components to the extent that it can segregate therefrom on a macroscopic scale. Thus, maintaining a homogeneous distribution of the second silicone rubber (B2) in the remaining components until final cure can be effected becomes very difficult as the DP exceeds about 600 and, it is believed, virtually impossible if the DP exceeds 1,000.

Using a system of silicone rubbers having a bimodal distribution of nonfunctional linear chain lengths (i.e. (B1) in combination with (B2)) unexpectedly and synergistically raises the fracture toughness ($K_{Ic}$) and critical strain energy release rate ($G_{Ic}$) of cured silsesquioxane resin structures which incorporate the same. This increase in fracture toughness and critical strain energy release rate is well beyond that predicted by the use of (B1) and (B2), independently.

In a fully cured copolymer derived solely from (I) an organosilicone silsesquioxane resin (or precursors thereof) and (B1), the first silicone rubber, the presence of the rubber component is not visually revealed in the microstructure. On the other hand, the nonfunctional linear chain length of the second silicone rubber (B2) is great enough so that this component appears in the microstructure as a second, segregated phase in a form that approximates spheres. Although chemically bound to the silsesquioxane resin, the spheres of component (B2) may be clearly visible under high magnification available from the use of a scanning electron microscope.

It has been discovered that the size of the spheres formed by the use of the second silicone rubber component (B2) is directly related to the degree of toughening imparted thereby. It is preferred that the size of the spheres be less than about 2 micrometers and even more preferred that the size be less than about 1 micrometer and even as small as 60 to 100 nanometers.

While the scope of the present invention is not limited by the application of any particular theory, it is suggested that the size of the spheres formed by the second silicone rubber component (B2) should be of a diameter less than the diameter of the plastic zone formed about a crack tip in the resin matrix, when the crack is advancing. When this relationship is maintained, it is believed that the (B2) rubber spheres effectively blunt the radius of the crack tip and inhibit its propagation. When the size of the (B2) rubber spheres exceeds that of the plastic zone at the crack tip, the spheres act more as a defect and can actually reduce the toughness of the resin matrix.

The size of the spheres formed by the second silicone rubber (B2) in the resin matrix is directly proportional to the degree of polymerization thereof and the amount employed in the final composition. The above-stated parameters regarding the degree of polymerization (or nonfunctional linear chain length) help to ensure that the size of the spheres formed by the second silicone rubber (B2) contribute to increased toughness.

In one embodiment of the invention, the organosilicon composition (A) is an organosilicone resin (I) which is first formed to the desired molecular weight before copolymerization with the silicone rubbers (B1) and (B2). It is preferable to first blend the resin (I) with the silicone rubbers (B1) and (B2) in an organic solvent, such as toluene, along with the desired amount of crosslinker and a catalytic amount of an appropriate catalyst. It has been found that the more dilute the concentration of reactants, the smaller the size of the (B2) spheres ultimately formed in the cured resin. The composition is devolatilized, cast into a mold and thereafter thermally cured. In some instances, devolatilization can take place in the mold. If devolatilization is carried out at an elevated temperature, the addition of the curing catalyst is made after cooling.

In another embodiment of the invention, the composition may be injection molded after the devolatilization step.

In compositions of the invention which utilize condensation reactions between the organosilicon composition (A) and the rubbers (B1) and (B2), it is possible to first selectively copolymerize the organosilicon composition molecules and the rubber molecules, with one another, before carrying out final cure.

For example, an organosilicon composition (A) in the form of a resin (I) and the silicone rubbers (B1) and (B2) are dissolved in an organic solvent, such as toluene, along with the desired amount of a crosslinker, if any, and a condensation catalyst. It is preferred to use a relatively weak condensation catalyst such as titaniumtetrabutoxide. At a temperature of about 90° C., this first, relatively weak catalyst triggers the copolymerization step between the organosilicon composition (A) molecules, the rubber (B1) and (B2) molecules and the cross-linker molecules, if any, without causing substantial homopolymerization between the organosilicon composition molecules or rubber molecules. The reaction is preferably carried out to the extent that substantially all of the rubber molecules are copolymerized with the organosilicon compound (A).

It is anticipated that the alkoxides of the other Group IVA metals, zirconium and hafnium, would likewise function as relatively weak condensation catalysts.

Those skilled in the art will recognize that under the above conditions, some homopolymerization takes place. The lack of substantial homopolymerization means, however, that the system does not gel and the copolymer so-formed remains soluble and stable in the organic solvent. The skilled artisan will also recognize that this "light" copolymerization is akin to light bodying. Light copolymerization can be controlled by the concentration of the catalyst used, relative to its catalytic strength, and the temperature at which the light copolymerization is carried out.

The copolymer in the "lightly" copolymerized state described above remains in solution. Thereafter, a relatively strong condensation catalyst, such as Dow Corning® catalyst 15, or Y-177, choline octoate and zinc octoate catalysts, respectively, (both of which are commercially available from the Dow Coming Corporation, Midland Mich.,) can be added to the "lightly copolymerized" solution. The solution may then be cast, devolatilized and finally cured to a rigid state by the application of heat. Often, final curing can be augmented by the application of pressure. In the condensation cure system, it is believed that final cure is accomplished through the condensation of residual silanol groups associated with the resin (I).

When the silicone rubbers (B1) and (B2) contain hydrolyzable or condensable $R^5$ groups, the rubbers may be blended with the hydrolyzable precursors (II) of the organosilicone resin (I), or (III) a partial hydrolyzate of (II), which is then followed by a hydrolysis/condensation reaction to complete the light copolymerization step. The light copolymerization step may be catalyzed with a relatively weak catalyst, as above, until the composition reaches a desired viscosity for casting. Thereafter, the composition is devolatilized and an appropriate relatively strong condensation catalyst may be added. The material is then cast and finally thermally cured.

The present inventors have also discovered that when copolymerization is carried out via a condensation reaction, the thermal treatment of the composition during final cure can influence the size of the spheres formed in the final product by the second silicone rubber (B2). The final curing cycle after devolatilization always starts at a temperature less than 100° C. to prevent the water generated by curing from introducing voids in the resin structure. Thereafter, the temperature is slowly raised at the rate of about 5° C. per hour until a final temperature of about 260° C. is reached. It has been discovered , however, that the higher the starting temperature for the final cure, the smaller the ultimate size of the spheres formed by the segregated (B2) component.

Regardless of the route used to obtain the rubber-modified silicone resin of the invention, the cured composition exhibits the desired rigidity and increased fracture toughness.

The copolymer of the present invention may be formed with or without the aid of a crosslinker and, in the case of condensation cured compositions, with or without the aid of a catalyst. Those skilled in the art will appreciate that the use of a crosslinker that includes three or more functional groups that are capable of reaction with the $R^5$ groups of the rubbers (B1) and (B2), yields branched silicone rubbers.

Furthermore, the type of cure mechanism used to obtain the copolymer of the invention, is not particularly limited and may include those generally referred to as a condensation-cure systems, addition-cure systems and free radical polymerization.

It will be appreciated that in systems that incorporate alkenyl groups, such as vinyl groups, to impart reactive functionality to the silicone resin and silicone rubbers, free radical polymerization may be used as viable cure system. A free radical initiator, such as a peroxide, is employed. Commonly used initiators include aryl peroxides. A well-known vinyl-specific peroxide initiator is $(CH_3)_3COOC(CH_3)_3$.

For condensation-cure systems, metal esters or alkoxides of tin, titanium and zinc are all preferred catalysts. Titanium tetrabutoxide, dibutyl tin dilaurate and zinc octoate are well-known examples. Tin catalysts, however, tend to decrease the thermal stability of the cured rubber-modified rigid resins of the invention and should be avoided for high temperature applications. Even less preferred but still usable are strong acids and bases, such as sulfuric acid, phosphoric acid, potassium hydroxide, cesium hydroxide, metal silanolates and calcined lime. These latter catalysts likewise compromise the thermal stability of cured rigid silicone castings. Also useful are amine and metal carboxylates and quaternary bases. Those skilled in the art will recognize that certain quaternary bases, such as tetramethyl ammonium hydroxide, have the advantage that they decompose to volatile by-products when heated to curing temperatures, and are thus readily removed from the silicone resin/rubber copolymer matrix of the invention.

Care must be taken when volatile by-products are formed by the cure mechanism. Such volatile by-products can cause a considerable reduction in toughness by the formation of bubbles, which act as casting defects.

For addition-cure systems, platinum-based catalysts, such as chloroplatinic acid, are frequently used. In fact, suitable platinum-based catalysts include platinum compounds and platinum complexes. In addition to chloroplatinic acid, chloroplatinic acid hexhydrate, Karstedt's catalyst (i.e. a complex of chloroplatinic acid with sym-divinyltetramethyldisiloxane), dichlorobis (triphenylphosphine)platinum(II), platinum chloride and platinum oxide may all be used.

Those skilled in the art will appreciate that in condensation curing systems, copolymerization between the silicone resin and silicone rubbers and final cure of the copolymerized system can be induced in the absence of a catalyst. However, such reactions require the application of high temperatures and for this reason are not preferred. Also, the light, preferential copolymerization described above cannot be accomplished without the aid of a catalyst.

Suitable crosslinkers for practicing the present invention include such crosslinkers that are well known in the production and curing of silicone rubbers. Indeed, all such crosslinkers are silicon-based, meaning that their chemical formulae include at least one silicon atom. Tetraethoxysilane, methyltrimethoxysilane and methyltriacetoxy-, methyltrioximo- and tetraoximosilane are well-known examples. The crosslinker may include relatively short siloxy chains between reactive functional groups. As used herein, then, the term "crosslinker" is limited to silanes and to such siloxanes wherein the DP of the siloxy chain is less than six.

The use of acid hydrolysis and condensation to form organosilicone resins generally results in a composition that includes a considerable concentration of nonsterically-hindered residual hydroxyl groups. Thus, condensation reactions using the residual hydroxy functionality of the resin is a convenient way to form the copolymer of the invention through a condensation cure system.

It is contemplated that the fracture-resistant silicone resin compositions of the invention will have great utility in the manufacture of structural or load-bearing components. Furthermore, the compositions of the invention are very advantageously used as the continuous phase in composite materials, such as fiber-reinforced rubber-modified rigid resins, wherein the fiber represents the discontinuous phase. Numerous fibers for composites are well-known, including glass and graphite.

The compositions of the invention may be put to many other uses. For instance, solutions comprising the lightly copolymerized organosilicon composition (A) and rubbers (B1) and (B2) in an organic solvent may be used to form a curable coating over a substrate, which may function as an adhesive. Likewise, the compositions of the invention may be cured into the form of films or sheet products.

EXAMPLES

A first resin (designated herein as RES1) was modified with two different types of silicone rubber (designated herein as RUB2 and RUB4), both independently and in combination, at various weight percents up to a maximum of about 20 weight percent. For purposes of clarity, the designations of the resin as RES1 and the first (B1) and second (B2) silicone rubbers as RUB2 and RUB4, respectively, have been maintained consistent with the designation of these components in previously-mentioned copending patent application Ser. Nos. 08/775,557 and 08/775,661. RUB2 and RUB4 were prepared as described therein. The various resin compositions were also prepared in toluene, cast and cured into square slabs, and tested in the manner described therein.

RES1 was a silsesquioxane resin (commercially from Dow Corning® 4-3136, Dow Corning Corporation, Midland Mich.) having the following empirical formula:

$(MeSiO_{3/2})_{0.45}(PhSiO_{3/2})_{0.40}(Ph_2SiO_{2/2})_{0.10}(PhMeSiO_{2/2})_{0.05}$ and an Mn, number average molecular weight, of about 1,300 or less, where Me and Ph represent methyl and phenyl groups, respectively. The resin is made available in the form of a solid flake.

Silsesquioxane resins formed by acid hydrolysis/ condensation generally include a substantial quantity of nonsterically-hindered hydroxyl groups. The above empirical formula ignores such residual hydroxyl groups (sometimes referred to as residual silanol groups.) Because these groups are the reactive groups responsible for copolymerization in condensation cure systems in accordance with the invention, the above formula may be rewritten in the approximate empirical form, accounting for the residual hydroxyl groups, as follows:

$Me_{0.69}Ph_{0.43}(OH)_{0.025}SiO_{1.43}$ where Me and Ph are as above.

RUB2 and RUB4 were triethoxysilyl-terminated polydimethylsiloxane having a DP of 14 and 376, respectively.

Referring now to the drawings, and in particular to FIG. 1, it can be seen that independent additions of the first silicone rubber (B1) (RUB2) cause the flexural strain at fracture of the cured resin matrix to increase with increasing amounts. Conversely, independent additions of the second silicone rubber (B2) (RUB4) cause the flexural strain to rise slightly and then rapidly fall with increasing amounts. Surprisingly, when the resin is modified with 10 weight percent RUB2 in combination with 2.5 and 5 weight percent RUB4, the flexural strain at fracture is enhanced.

Figure 2:
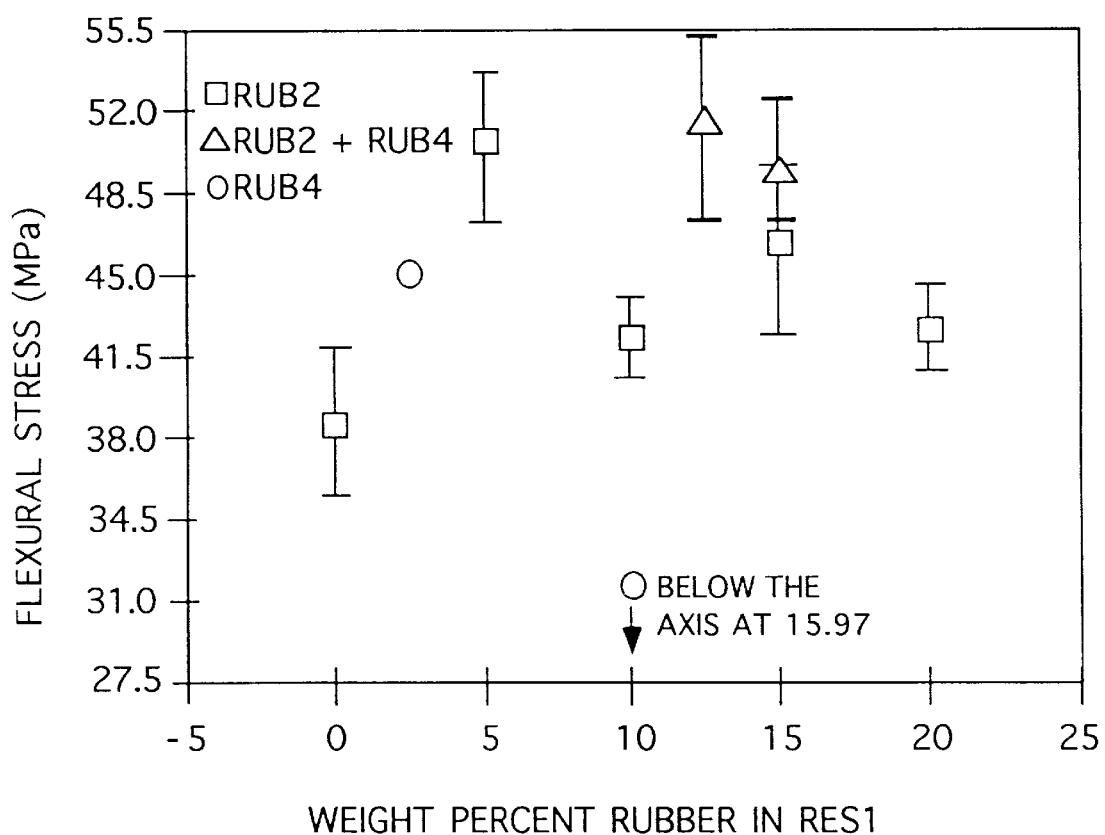
FIG. 2 is a graph of the Flexural Stress, at fracture, of the silicone rubber-modified resins of FIG. 1, as a function of weight percent silicone rubber.

FIG. 2 shows that the flexural stress at fracture of rubber-modified resin varies in a manner very similar to flexural strain in response additions of RUB2 and RUB4, made independently and in combination.

Figure 3:
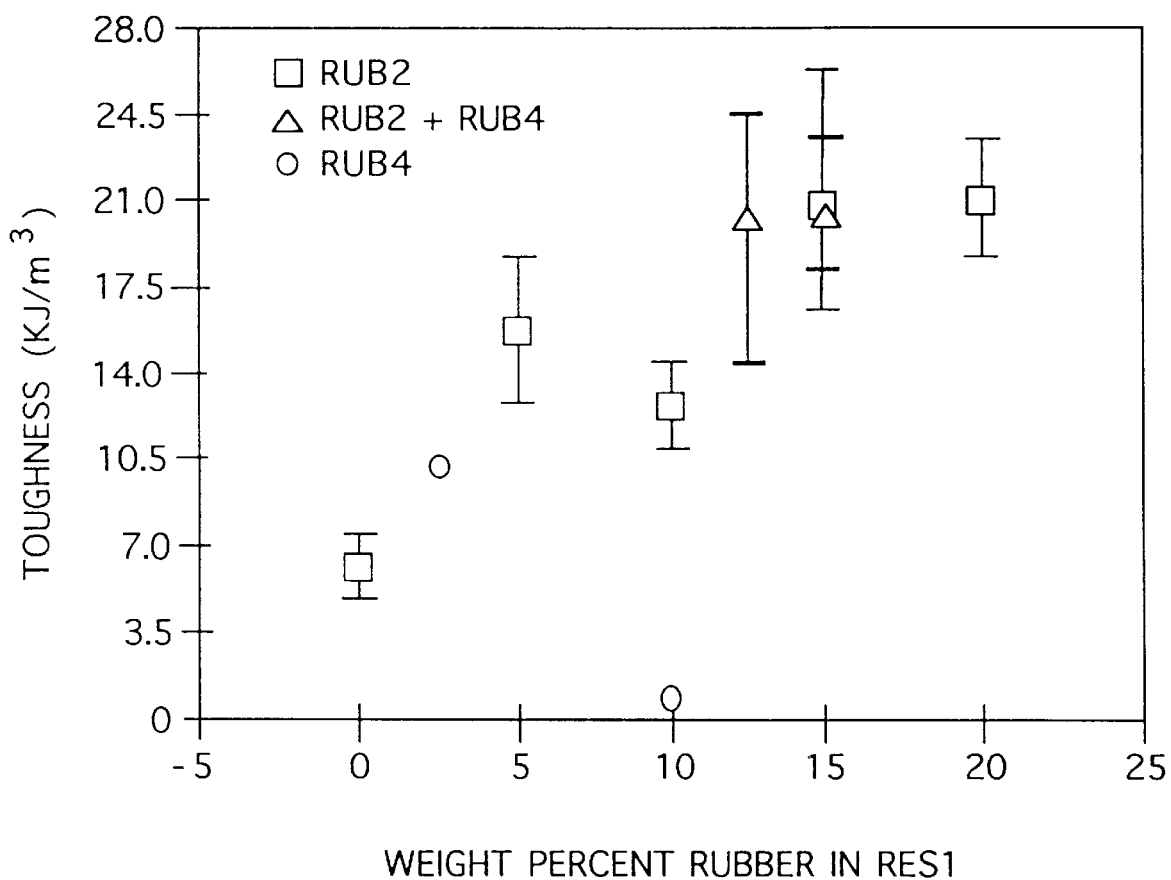
FIG. 3 is a graph of the Toughness of the silicone rubber-modified resins of FIG. 1, as a function of weight percent silicone rubber and as measured by the area under the stress-strain curve.

FIG. 3 discloses that the toughness of the rubber-modified silicone resin varies in a manner consistent with flexural strain and flexural stress in response to additions of RUB2 and RUB4, made independently and in combination.

Figure 4:
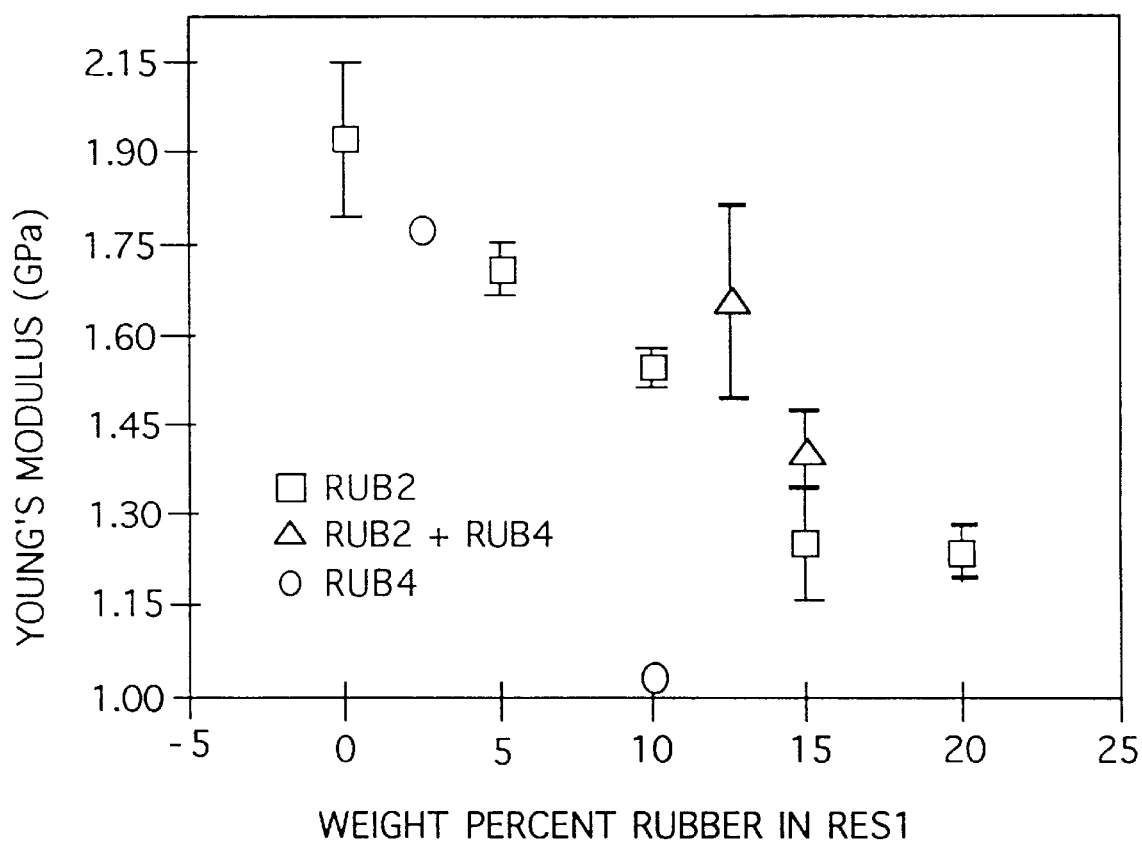
FIG. 4 is a graph of the Young's Modulus of the silicone rubber-modified resins of FIG. 1, as a function of weight percent silicone rubber.

FIG. 4 shows that the Young's modulus of the rubber-modified silicone resin decreases gradually with increasing amounts of the first silicone rubber (B1) RUB2, added independently. Young's modulus of the cured resin decreases rapidly with independent additions of the second silicone rubber (B2) RUB4. Quite unexpectedly, however, when 2.5 and 5 weight percent additions of RUB4 are combined with 10 weight percent RUB2, the Young's modulus of the cured resin is not so adversely affected.

Figure 5:
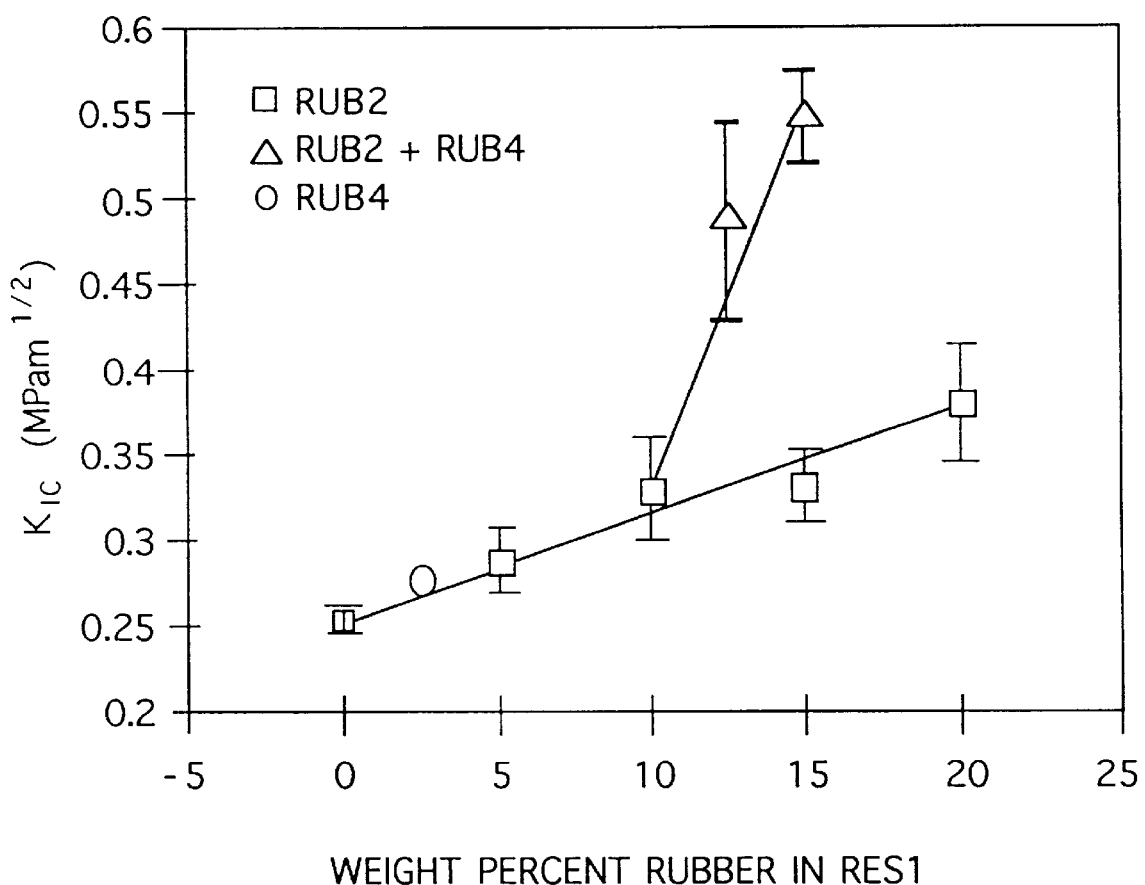
FIG. 5 is a graph of the fracture toughness, $K_{Ic}$, of the silicone rubber-modified resins of FIG. 1, as determined in accordance with ASTM D 5045 and shown as a function of weight percent silicone rubber.
Figure 6:
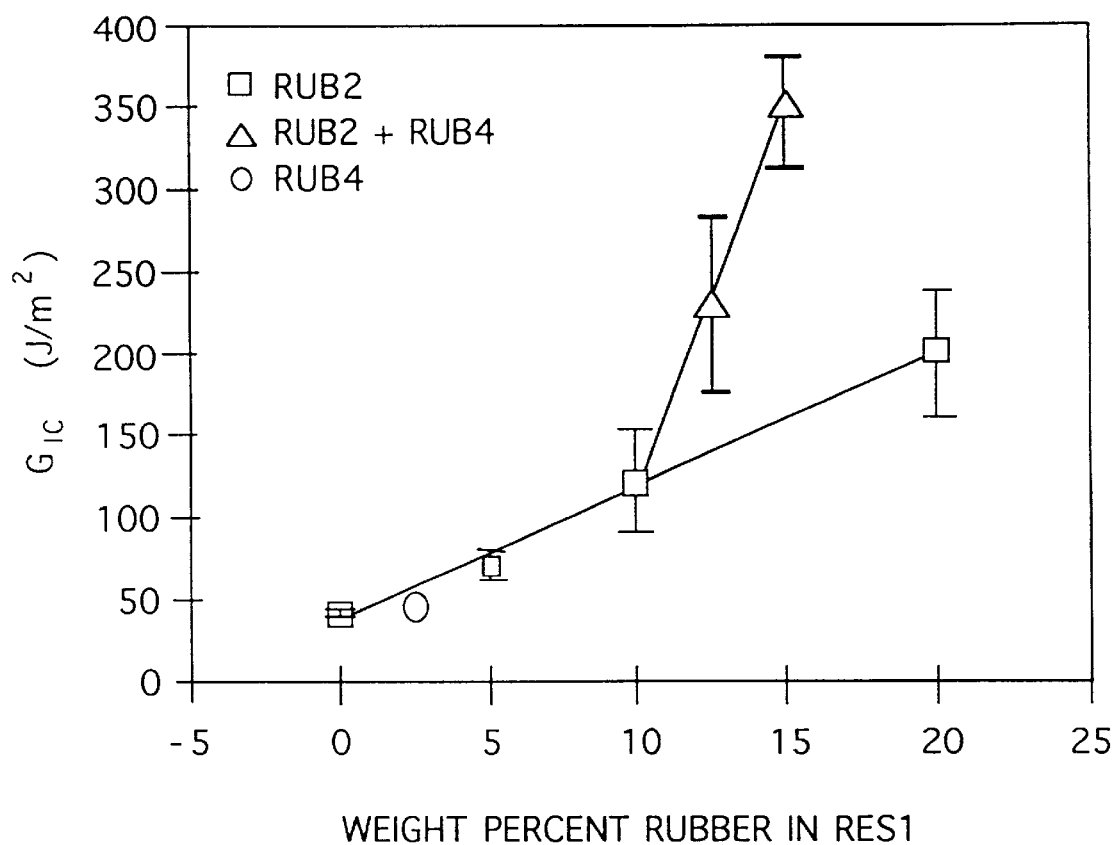
FIG. 6 is a graph of the critical strain energy release rate, $G_{Ic}$, of the silicone rubber-modified resins of FIG. 1, as determined in accordance with ASTM D 5045 and shown as a function of weight percent silicone rubber.

FIGS. 5 and 6 reveal the most startling results obtained by modifying silsesquioxane resins in accordance with the present invention. Independent additions of (B1) RUB2 up to about 20 weight percent produce a considerable rise in the values of $K_{Ic}$ and $G_{Ic}$. An independent addition of (B2) RUB4 at 5 weight percent produces a material so brittle that the values of $K_{Ic}$ and $G_{Ic}$ cannot be reliably determined. However, when 10 weight percent of (B1) RUB2 is combined with 2.5 and 5.0 weight percent of (B2) RUB4 in accordance with the invention, the values of $K_{Ic}$ and $G_{Ic}$ increase dramatically over that obtained with comparable silicone rubber loading using (B1) RUB2, alone.

In another experiment, 100 weight parts of RES1, 10 weight parts of a first silicone rubber (B1) RUB3 (a triethoxysilyl-terminated polydimethylsiloxane having a DP of 55, described in the previously-mentioned copending patent applications) and 2.5 weight parts of a second silicone rubber (B2) designed herein as RUB5 (a triethoxysilyl-terminated polydimethylsiloxane having a DP of 586) were copolymerized in accordance with the invention. The light copolymerization was carried out in a toluene solution using 0.18% tetrabutyltitinate catalyst. Slabs were cast and cured and mechanical properties were measured as previously described. The combination of RES1 with RUB3 and RUB5 had values of strain at failure, strength at failure, Young' moulus, $K_{Ic}$, $G_{Ic}$ and stress-strain toughness that were slightly better than that measured in unmodified and unfilled but fully cured RES1, but not quite as good as those exhibited by RES1 modified by RUB3, alone. It is believed that the large particle size of the segregated spheres formed by the RUB5 additions (about 12–50 micrometers) actually embrittled the cured resin.

Although the preceding invention has been described and illustrated by way of example to point out certain features and advantages thereof, the scope of the present invention should be interpreted only in accordance with the following claims and equivalents thereof.

What is claimed is:

1. A rubber-modified rigid silicone resin comprising a copolymerized reaction product of:
(A) an organosilicon composition selected from the group consisting of:
(I) an organosilicone resin consisting essentially of silsesquioxane units and of the empirical formula $$R^1_a R^2_b R^3_c SiO_{(4-a-b-c)/2}$$

wherein: a is a positive numerical value, b and c are zero or positive numerical values with the proviso that $0.8 \leq (a+b+c) \leq 1.6$, $R^1$, $R^2$ and $R^3$ are monovalent radicals independently selected from the group consisting of hydrogen, hydroxyl, alkyl, alkenyl, alkoxy, oximo, alkyloximo, aryloximo, aryl, alkylepoxide, arylepoxide, alkylcarboxyl, arylcarboxyl, alkylether, arylether, alkylamide, arylamide, alkyl amino and arylamino radicals; and
(II) hydrolyzable precursors of (I); and
(III) an hydrolyzate formed from (II);
(B1) a first silicone rubber of the empirical formula:

$$(R^4_{(3-p)} R^5_p SiO_{1/2})(R^4_2 SiO_{2/2})_x-$$
$$\{(R^4_{(2-q)} R^5_q SiO_{2/2})(R^4_2 SiO_{2/2})_x\}_y (R^4_{(3-p)} R^5_p SiO_{1/2})$$

wherein each $R^4$ is a monovalent radical independently selected from the group consisting of alkyl and aryl radicals, each $R^5$ is a monovalent radical independently selected from the group consisting of hydrogen, hydroxyl, alkenyl, alkoxy, oximo, alkyloximo, aryloximo, alkylepoxide, arylepoxide, alkylcarboxyl, arylcarboxyl, alkylamide, arylamide, aklyl amino and arylamino radicals, p is 1, 2 or 3, q is 1 or 2, x ranges from 6 to 100, and y ranges from zero to 10; and
(B2) a second silicone rubber of the empirical formula $$(R^4_{(3-p)} R^5_p SiO_{1/2})(R^4_2 SiO_{2/2})_w (R^4_{(3-p)} R^5_p SiO_{1/2})$$

wherein R4, R5 and p are as defined above and w ranges from about 200 to about 1,000;
said organosilicon composition (A) and said first and second silicone rubbers (B1) and (B2) being present in relative quantities such that said rubber-modified silicone resin has a Young's modulus of at least $6.9 \times 10^8$ Pa.

2. A rubber-modified silicone resin in accordance with claim 1 wherein said copolymerized reaction product is obtained by a condensation reaction.

3. A rubber-modified silicone resin in accordance with claim 2 wherein said condensation reaction is carried out in the presence of a condensation catalyst.

4. A composition in accordance with claim 3 wherein said condensation catalyst is selected from the group consisting of choline octoate and metal esters and alkoxides of tin, titanium and zinc.

5. A rubber-modified silicone resin in accordance with claim 1 wherein said copolymerized reaction product is obtained by an addition reaction.

6. A rubber-modified silicone resin in accordance with claim 5 wherein said addition reaction is carried out in the presence of (D) an addition catalyst.

7. A rubber modified silicone resin in accordance with claim 6 wherein said addition catalyst is selected from the group consisting of platinum compounds and platinum complexes.

8. A rubber-modified silicone resin in accordance with claim 1 wherein said copolymerization reaction product further comprises a silicon-based crosslinker.

9. A rubber-modified silicone resin in accordance with claim 1 wherein said copolymerized reaction product is obtained by free-radical polymerization.

10. A rubber-modified silicone resin in accordance with claim 1 wherein said first silicone rubber (B1) is present in an amount up to 30 weight percent of said composition and said second silicone rubber is present in an amount up to 20 weight percent of said composition, with the proviso that the aggregate quantity of (B1) and (B2) does not exceed about 35 weight percent of the composition of the invention.

11. A composition in accordance with claim 10 wherein said first silicone rubber (B1) is present in an amount of about 10 weight percent and said second silicone rubber is present in an amount from 2.5 and 5 weight percent of said composition.

12. A composition in accordance with claim 1 wherein said second silicone rubber (B2) segregates from the remaining components and is present in said resin in a shape that approximates spheres.

13. A composition in accordance with claim 12 wherein said spheres have a diameter of 2 micrometers or less.

14. A composition in accordance with claim 13 wherein said spheres have a diameter of about 1 micron or less.

15. A composition in accordance with claim 14 wherein said spheres have a diameter ranging from 60 to 100 nanometers.

* * * * *